L. A. YOUNG.

LATCH.

APPLICATION FILED MAY 6, 1916.

Reissued Oct. 17, 1916.

14,205.

2 SHEETS—SHEET 1.

INVENTOR

Leonard A. Young.

BY

Ralzemond A. Parker

ATTORNEY

L. A. YOUNG.

LATCH.

APPLICATION FILED MAY 6, 1916.

Reissued Oct. 17, 1916.

14,205.

2 SHEETS—SHEET 2.

INVENTOR

Leonard A. Young.

BY

Ralzemond A. Parker

ATTORNEY

UNITED STATES PATENT OFFICE.

LEONARD A. YOUNG, OF HIGHLAND PARK, MICHIGAN.

LATCH.

14,205. Specification of Reissued Letters Patent. Reissued Oct. 17, 1916.

Original No. 1,110,368, dated September 15, 1914, Serial No. 844,636, filed June 12, 1914. Application for reissue filed May 6, 1916. Serial No. 95,985.

*To all whom it may concern:*

Be it known that I, LEONARD A. YOUNG, a citizen of the United States of America, residing at Highland Park, in the county of Wayne and State of Michigan, have invented certain new and useful Improvements in Latches, of which the following is a specification, reference being had therein to the accompanying drawings.

In fitting doors, casings and other like parts which close upon each other, especially in refrigerators, ovens or like places, it is desirable that means be used for yieldingly maintaining the closure against the containing frame in such manner that the point between the two is kept tight regardless of slight variations due to expansion or contraction of the parts from climatic changes and the like.

This invention relates to a latch and to an arrangement thereof whereby the door or other closure to which it is applied is firmly held yieldingly and tightly against its jamb or casing, such contact being maintained even when the door or frame swells or contracts.

The invention consists in the matters hereinafter set forth and more particularly pointed out in the appended claims.

Figure 1:
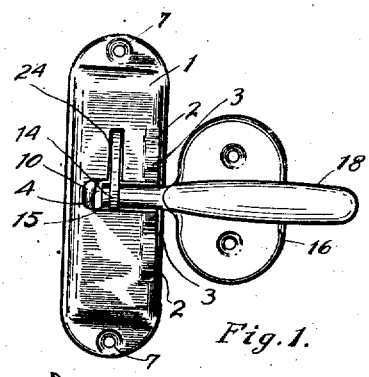
Figure 3:
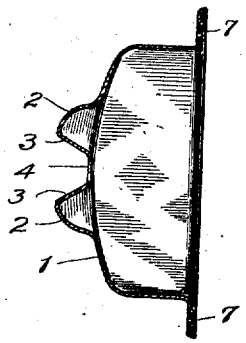
Figure 2:
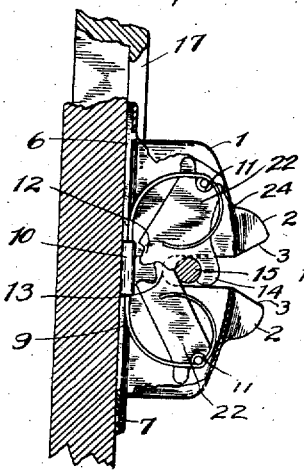
Figure 4:
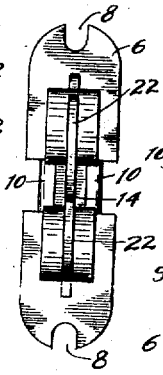
Figure 5:
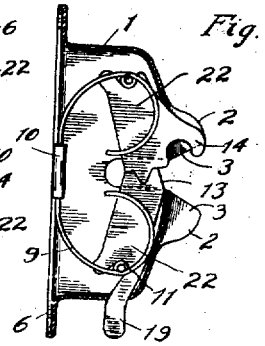
Figure 9:
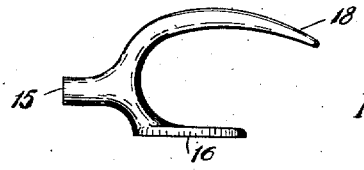
Figure 6:
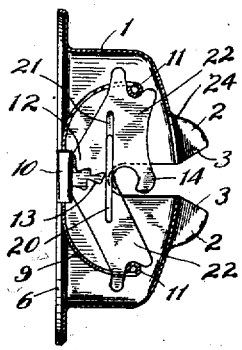
Figure 7:
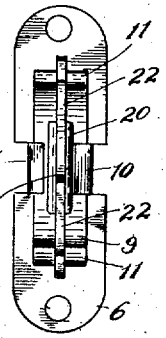
Figure 10:
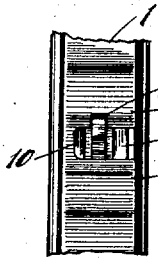
Figure 8:
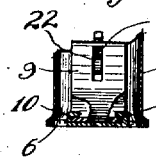
Figure 11:
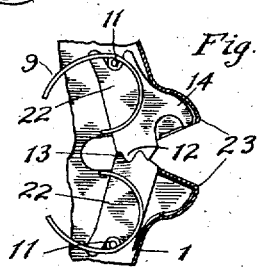

In the drawings,—Figure 1 is a view in front elevation of a latch embodying features of the invention showing a striker and catch in closed relation. Fig. 2 is a view in vertical section through the closed latch showing the same applied to a door and door jamb. Fig. 3 is a view in longitudinal section in detail of a casing. Fig. 4 is a view in detail of a bed plate and spring. Fig. 5 is a view in longitudinal section through a modification of the latch showing one of the catch members provided with a thumb piece. Fig. 6 is a view in longitudinal section in detail showing a slight modification of the latch mechanism. Fig. 7 is a view in detail of the spring, latch members and bed plate of the modification. Fig. 8 is a view in transverse section through a spring, bed plate and adjacent parts. Fig. 9 is a view in detail of a striker member that likewise constitutes a handle. Fig. 10 is a view in detail showing a modification of a casing. Fig. 11 is a view in detail and in section through the modified casing, showing the relation thereof on the latch member.

Referring to the drawings, an exterior casing 1 that is formed or struck up of sheet metal or otherwise made of suitable material, has a pair of projecting guide lugs 2 on its front face whose adjacent convergent faces 3 terminate at the margins of a slot indicated at 4 in the front wall. The flanged base of the casing is adapted to be applied to the casing or jamb of a door or the like on which the latch is mounted, and is arranged to retain a bed plate 6, screws or other fastening means that pass through openings 7 in the casing flange and registering slots 8 in the plate holding the parts in position.

A U-shaped spring strip 9 is secured as by inturned ears 10 or the like to the base plate within the casing, the oppositely disposed arms having longitudinally disposed slots and the resultant center tongue of each arm being shortened and inrolled as indicated at 11 for a bearing. A pair of oppositely disposed latch plates or toggle arms 22 have recessed inner ends which bear against the inrolled tongue portions 11 of the springs, and abutting outer end faces which are in rolling contact, the positive interaction of the parts being secured by segmental gear teeth 12 and 13. A retaining ear or keeper 14 is formed on one of the members 11 in such relation thereto that when the parts are forced inwardly past the line of the pivot portions 11 (the dead center line or point of maximum resistance) the keeper tends to keep an inserted member, as for example, a striker 15 which is mounted by a suitably designed portion base 16 on the closure or door 17 to which the latch is applied. A longitudinal slot 24 is formed in the casing to clear the keeper 14 when the arms are in outwardly projecting relation or in open position as indicated in Fig. 5, in which relation the outer wall of the casing 1 acts as a retainer to limit the movement of the arms. The portions of the spring 9 that extend beyond the pivot bearings 11 are inturned and act as parallel face guides between which the latch members are free to oscillate. The parts are further so proportioned that when the striker is guided into the slot 4 by the converging faces 3 of the guide lugs 2, and is thereby encountered and forces the latch members inward against the outwardly yielding arms of the spring, and the door 17 is contacted with the jamb member, the latch members are still clear of the spring or base plate and because of the converging tendency of the spring arms exert an inward pressure upon the striker 15 and thereby close the joint between the door and the jamb under all normal working conditions.

A handle member 18 on the striker facilitates the operation of the latter and is also in such convenient relation to the casing that in a modified form of the latch wherein one of the latch members has a thumb piece or lever-like extension 19 extending through a suitable opening in the casing, the hand of the operator may grasp the handle 18 and with the thumb as a fulcrum pressing against the thumb piece 19 assist materially in unsnapping or releasing the latch members.

In the modification shown in Figs. 6 and 7 a link 20 having parallel sides passes through an opening in one of the latch members and plays in a slot 21 in the other acting as a guide to replace the extended portions of the main spring for maintaining the latch members in alined relation.

The casing may be so modified, as shown in Figs. 10 and 11, that holder guide lugs 23 thereon completely house the latch members, the longitudinal slot 24 of the other construction being omitted.

As a result of this construction a latch is obtained that is quickly and readily applied to any door that maintains the door in tightly closed position and that readily yields to a pull so as to release the door without the necessity of turning a handle or throwing a latch bolt.

Obviously, changes in the details of construction may be made without departing from the spirit of my invention and I do not care to limit myself to any particular form or arrangement of parts.

What I claim is:

1. A latch comprising a striker, a casing provided with guiding means for receiving the striker, a spring member in the casing having a pair of oppositely disposed arms, a pair of oppositely disposed latch members pivotally and detachably interlocking with the spring arms near the outer ends and in rolling contact near their inner ends which lie in the path of the striker, a keeper on one of the latch members for engaging the striker, the latch members and spring cooperating to yieldingly maintain an inward pressure on the striker when the latter has passed the line of pivotal connections between the spring and the latch members, and means in sliding engagement with the latch members for maintaining them in alined relation.

2. A latch comprising a striker, a casing having a receiving slot therefor, guide projections on the casing adjacent the slot, a spring secured between its ends in the casing and provided with oppositely extending arms, a pair of latch plates detachably fulcrumed near their outer ends on the spring arms with their inner end portions in rolling contact in the path of the striker, said arms being adapted to grip an inserted striker and force it yieldingly inward when the striker has passed the line of pivotal attachment of the latch plates and springs, and a thumb piece on one of the latch members extending through the casing on the side of the latch plate fulcrum opposite the guide slots.

3. A latch comprising a striker, a casing provided with a guide way for receiving the striker, a spring mounted in the casing having oppositely disposed longitudinally slotted arms each with an inrolled middle tongue forming a fulcrum bearing, a pair of latch plates each seated at its inner end against the fulcrum of a spring arm between the outer arms thereof, the outer end portions of the latch plates being in rolling contact and in the path of the striker, and a keeper for retaining the striker against the latch plates and forcing the striker inward when the latter has passed the line of the spring fulcrums.

4. A latch comprising a striker, a casing having a receiving slot for the striker, a pair of oppositely disposed guide members for directing the striker into the slot, a spring member secured between its ends in the casing and provided with oppositely disposed arms, a longitudinal tongue formed from each arm and inrolled as a fulcrum bearing, a pair of latch plates, the inner end faces of which are arranged to rock upon the fulcrum bearings and between the outer portions of the spring arms, the outer end portions of the plates being in rolling engagement and in the path of the striker, and a keeper for retaining the striker against the latch plates and coöperating with the spring and latch plates to force the striker inwardly when it has passed the line of fulcrum bearings.

5. A latch comprising a striker, a casing having a receiving slot for the striker, a pair of oppositely disposed guide members for directing the striker into the slot, a spring member secured between its ends in the casing and provided with oppositely disposed arms, a longitudinal tongue formed from each arm and inrolled as a fulcrum bearing, a pair of latch plates, the inner end faces of which are arranged to rock upon the fulcrum bearings and between the outer portions of the spring arms, the outer end portions of the plates being in rolling engagement and in the path of the striker, a keeper for retaining the striker against the latch plates and coöperating with the spring and latch plates to force the striker inwardly when it has passed the line of fulcrum bearings, and means loosely embracing the free arms of the latch members and maintaining them in alined relation.

6. A latch comprising a striker provided with a handle and adapted to be secured to a closure, a casing provided with a guideway for receiving the striker and adapted to be secured to a frame member for the closure, a bed plate mounted in the casing, a spring member secured between the oppositely curved slotted end portions thereof to the bed plate, a latch plate fulcrum on each arm of the spring bridging a longitudinal slot therein, a pair of oppositely disposed latch plates with the inner ends thereof rocking against the fulcrums between the side portions of the spring arms, the outer end portions of the latch plates being in rolling contact and in the path of the striker, a keeper on one of the latch plates adapted to grip the striker and to coöperate with the spring arms and latch plates to force the striker inwardly when the latter has passed the line of the spring fulcrums and a thumb piece extending from the pivot end of one of the latch plates through an opening in the casing in manually operative relation to the handle of the striker.

7. A latch, having in combination, a pair of toggle arms maintained in toggle relation, a keeper on one of said arms, means for yieldingly resisting the arms passing their dead center line, a thumb lever secured to one of the toggle arms, a striker which may be caught and held by said keeper when the toggle arms pass the dead center line inwardly, and a handle attached to the striker which can be used with the thumb lever to disengage the striker.

8. A latch, having in combination, a pair of toggle arms maintained in toggle relation, a keeper on one of the toggle arms, a casing for housing the toggle arms and keeper and provided with an entrance opening and an opening in one end, a lever-like extension on one of the toggle arms protruding through the opening in one end of the casing, and a striker adapted to pass through the entrance opening in the casing and be caught and held by said keeper when the arms pass the dead center line inwardly.

9. A latch, having in combination, a latch arm provided with a hook and pivotally mounted, means for giving said latch-arm a yielding thrust and tending to keep the arm to one side or the other of the dead center thrust line, a thumb lever supported by the member upon which the latch is supported and operating on the latch arm to assist in thrusting it by the dead center thrust line, a striker arranged to be caught and pressed inward by the hook of the latch arm, and a handle in proximity to the thumb lever so that the two may be conjointly operated with one hand to disengage the striker from the latch arm.

10. A latch, having in combination, a pair of toggle arms one of which is provided with a hook, means for tending to prevent the toggle arms passing their dead center, a thumb lever for thrusting the said toggle arms by the dead center, a striker arranged to be caught by the hook, and a handle carried on the member to which the striker is attached and operable in connection with the thumb lever with one hand by pushing in on the thumb lever and pulling out on said handle.

11. A latch, having in combination, a latch arm provided with a hook and pivotally mounted, means for tending to keep the latch arm on one side or the other of the dead center thrust line, a thumb lever oscillatingly supported on the member to which the latch arm is secured, the said thumb lever having connection with the latch arm so as to thrust the latch arm outward when the thumb lever is thrust inward, a striker, and a handle carried on the member to which the striker is attached and operable in conjunction with the thumb lever by placing the thumb on the thumb lever and pressing in and pulling outward on the handle with the remainder of the hand.

In witness hereof I have signed the above specification this 27th day of April, 1916 at Detroit, Michigan.

LEONARD A. YOUNG.